US011142210B2

(12) United States Patent
Kanbayashi et al.

(10) Patent No.: US 11,142,210 B2
(45) Date of Patent: Oct. 12, 2021

(54) ROAD SURFACE STATE ESTIMATION DEVICE

(71) Applicant: DENSO CORPORATION, Kariya (JP)

(72) Inventors: Ryosuke Kanbayashi, Kariya (JP); Takatoshi Sekizawa, Kariya (JP); Masashi Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 318 days.

(21) Appl. No.: 16/323,830

(22) PCT Filed: Jun. 23, 2017

(86) PCT No.: PCT/JP2017/023198
§ 371 (c)(1),
(2) Date: Feb. 7, 2019

(87) PCT Pub. No.: WO2018/030001
PCT Pub. Date: Feb. 15, 2018

(65) Prior Publication Data
US 2019/0176834 A1    Jun. 13, 2019

(30) Foreign Application Priority Data

Aug. 11, 2016  (JP) .............................. JP2016-158311
Jun. 5, 2017   (JP) .............................. JP2017-110685

(51) Int. Cl.
*B60W 40/068*    (2012.01)
*B60C 23/06*     (2006.01)
(Continued)

(52) U.S. Cl.
CPC ......... *B60W 40/068* (2013.01); *B60C 23/064* (2013.01); *B60C 23/065* (2013.01);
(Continued)

(58) Field of Classification Search
CPC .... B60W 40/068; B60T 8/176; B60T 8/1725; B60T 2210/12; B60T 2210/14; B60C 23/064; B60C 23/065; B60C 2019/004
See application file for complete search history.

(56) References Cited

U.S. PATENT DOCUMENTS 10,059,316 B2 *  8/2018  Hanatsuka ........... G01N 29/041
2011/0118989 A1  5/2011  Morinaga
(Continued)

FOREIGN PATENT DOCUMENTS

JP    2007055284 A    3/2007
JP    2011242303 A    12/2011
(Continued)

OTHER PUBLICATIONS

U.S. Appl. No. 16/313,069, filed Dec. 24, 2018, Mori et al.
(Continued)

*Primary Examiner* — Jess Whittington
*Assistant Examiner* — Brian E Yang
(74) *Attorney, Agent, or Firm* — Harness, Dickey & Pierce, P.L.C.

(57) ABSTRACT

A control unit of a tire-mounted sensor determines whether a tire has been exchanged. When the tire has been exchanged, the control unit changes the threshold value of a road surface state determination condition used for detecting the road surface state from vibration data of the tire detected by an acceleration sensor of the tire-mounted sensor. For example, the threshold value of the road surface state determination condition is reset upon determining that the tire has been exchanged, by transmitting an instruction to the tire-mounted sensor through a tool at an automobile maintenance shop, etc.

12 Claims, 7 Drawing Sheets

(51) Int. Cl.
    *B60T 8/172*       (2006.01)
    *B60T 8/176*       (2006.01)
    *B60C 19/00*       (2006.01)

(52) U.S. Cl.
    CPC ............ *B60T 8/176* (2013.01); *B60T 8/1725* (2013.01); *B60C 2019/004* (2013.01); *B60T 2210/12* (2013.01); *B60T 2210/14* (2013.01)

(56) References Cited

U.S. PATENT DOCUMENTS

| | | | |
|---|---|---|---|
| 2011/0264300 A1* | 10/2011 | Tuononen | G01M 17/02 |
| | | | 701/1 |
| 2013/0116972 A1 | 5/2013 | Hanatsuka et al. | |
| 2015/0210286 A1* | 7/2015 | Hanatsuka | B60C 99/00 |
| | | | 701/34.4 |
| 2016/0368501 A1* | 12/2016 | Suzuki | B60W 40/06 |
| 2016/0368502 A1 | 12/2016 | Suzuki et al. | |
| 2017/0057306 A1* | 3/2017 | Suzuki | G01B 17/00 |
| 2018/0264894 A1* | 9/2018 | Goto | B60T 8/172 |

FOREIGN PATENT DOCUMENTS

| | | |
|---|---|---|
| JP | 5620268 B2 | 11/2014 |
| JP | 2015174638 A | 10/2015 |

OTHER PUBLICATIONS

U.S. Appl. No. 16/317,052, filed Jan. 11, 2019, Sekizawa et al.
U.S. Appl. No. 16/322,166, filed Jan. 31, 2019, Kanbayashi et al.
U.S. Appl. No. 16/324,132, filed Feb. 8, 2019, Kanbayashi et al.

\* cited by examiner

ROAD SURFACE STATE ESTIMATION DEVICE

CROSS REFERENCE TO RELATED APPLICATIONS

This application is a U.S. National Phase Application under 35 U.S.C. 371 of International Application No. PCT/JP2017/023198 filed on Jun. 23, 2017. This application is based on and claims the benefit of priority from Japanese Patent Application No. 2016-158311 filed on Aug. 11, 2016 and Japanese Patent Application No. 2017-110685 filed on Jun. 5, 2017. The entire disclosures of all of the above applications are incorporated herein by reference.

TECHNICAL FIELD

The present disclosure relates to a road surface state estimation device, which includes a tire-mounted sensor for detecting vibrations applied to a tire and transmitting the detected vibrations as vibration data to a vehicle body side system, and estimates a road surface state based on the vibration data.

BACKGROUND ART

A road surface state estimation device conventionally known includes a tire-mounted sensor, which is provided on a back surface of a tire tread and estimates a road surface state by detecting vibrations applied to a tire by the tire-mounted sensor and transmitting a detection result of the vibrations to a vehicle body side system. According to this device, the road surface state is estimated by calculating an index such as an integrated voltage value of a vibration waveform, which is used to estimate the road surface state based on the vibration waveform detected by a vibration detection unit of the tire-mounted sensor, and comparing the calculated index with a threshold value.

However, since the vibration waveform detected by the vibration detection unit varies with a tire state, it is preferred to vary the threshold value, which is used for comparison with the index in estimating the road surface state, in accordance with the tire state.

As a device for detecting a tire state, a tire wear estimation device which estimates a level of tire wear is proposed in patent literature 1.

PRIOR ART LITERATURE

Patent Literature

Patent Literature 1: JP 5620268

SUMMARY

However, when the tire is exchanged, the vibration waveform detected by the vibration detection unit does not change gradually like wear of a tire but changes between before and after the tire exchange. For this reason, when the tire is exchanged, the threshold value for comparison with the index used in estimation of the road surface state need be completely different from that used before the tire exchange. In case that the tire-mounted sensor is reused, the tire-mounted sensor having been attached to the tire used previously is attached to a tire newly used. In this case, the threshold value set for the tire before the tire exchange is not useful to estimate the road surface state accurately.

Further, the device disclosed in patent literature 1 detects only the level of wear. Even in case that the wear of the tire is detected, it does not necessarily enable accurate estimation of the road surface state.

It is an object of the present disclosure to provide a road surface state estimation device, which is capable of accurate estimation of a road surface state even in case that a tire-mounted sensor having been attached to a tire previously used before exchange is reused.

A road surface state estimation device comprises a tire-mounted sensor attached to a back surface of a tire and a vehicle body side system provided in a vehicle body side. The tire-mounted sensor includes a vibration detection unit for outputting an output voltage corresponding to a magnitude of vibration of the tire as a detection signal, a signal processing unit for detecting a road surface state from vibration data indicated by the detection signal of the vibration detection unit and a transmitter unit for transmitting road surface data indicating the road surface state. The vehicle body side system includes a control unit for receiving the road surface data transmitted from the transmitter unit and estimating the road surface state based on the road surface data. The signal processing unit changes a threshold value of a road surface state determination condition used in detecting the road surface state from the vibration data.

As described above, when the tire is exchanged, the threshold value of the road surface state determination condition is automatically reset. Thus even in case that the tire-mounted sensor having been attached to the pre-exchange tire is reused when the tire is exchanged, the road surface state estimation device is enabled to estimate the road surface state accurately.

EMBODIMENT

Embodiments of the present disclosure will be described below with reference to the drawings. In each embodiment described below, same or equivalent parts are designated with the same reference numerals.

First Embodiment

A road surface state estimation device 100 according to the present embodiment, which includes a tire-mounted sensor 1, will be described with reference to FIG. 1 to FIG. 8. The road surface state estimation device 100 according to the present embodiment estimates a road surface state, on which a vehicle travels. According to the present embodiment, the tire-mounted sensor 1 applied to tire road surface state estimation device 100 is provided with a function of learning a threshold value used in estimating the road surface state. The road surface state estimation device 100 according to the present embodiment will be described in detail below.

Figure 1:
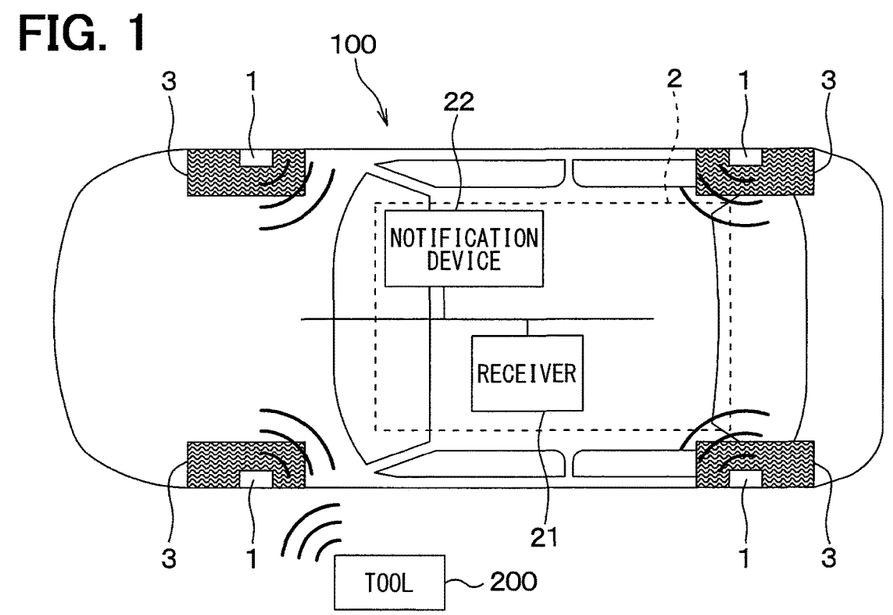
FIG. 1 is a view showing a block configuration of a road surface state estimation device according to a first embodiment.
Figure 2:
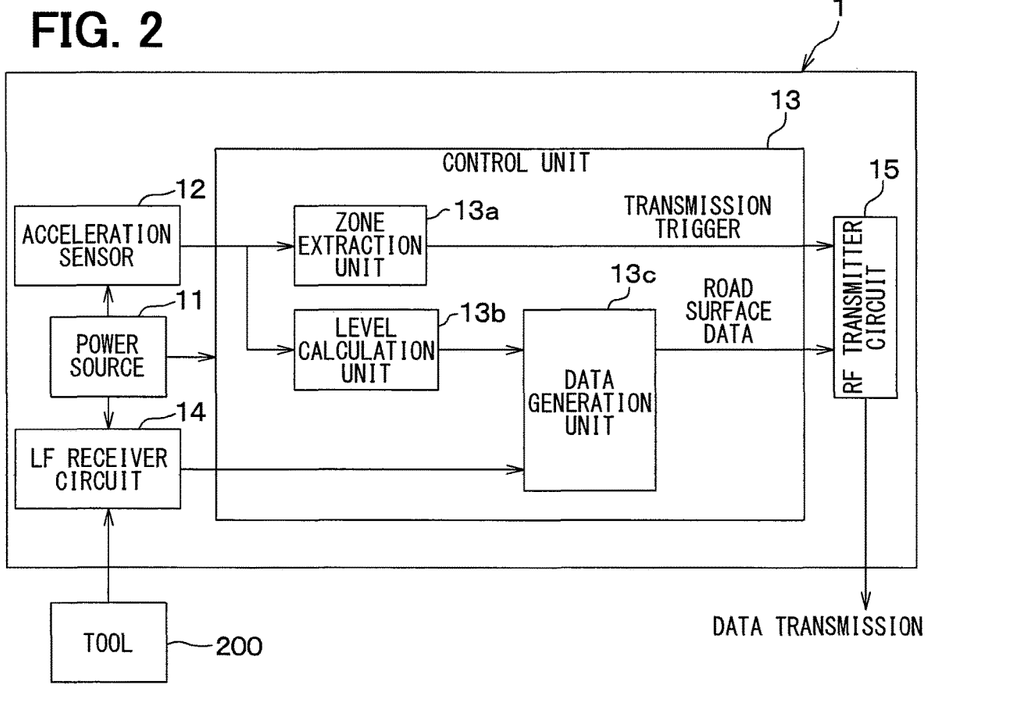
FIG. 2 is a block diagram of a tire-mounted sensor.

As shown in FIG. 1 and FIG. 2, the road surface state estimation device 100 is configured to have the tire-mounted sensor 1 attached to a wheel side and a vehicle body side system 2, which includes various units provided in a vehicle body side. The vehicle body side system 2 includes a receiver 21 and a notification device 22.

The road surface state estimation device 100 detects vibrations of a tire 3 provided in each wheel by the tire-mounted sensor 1 and transmits data, which indicate a road surface state such as data indicating a road surface μ between the tire 3 and a travel road, to the receiver 21 side by generating such data based on the vibration. Hereinafter, the road surface μ is referred to as μ data and the data including the μ data and indicating the road surface state is referred to as road surface data. Tire road surface state estimation device 100 receives the road surface data transmitted from the tire-mounted sensor 1 by the receiver 21 and sends the road surface state indicated by the road surface data from tire receiver 21. It is thus possible to send to a driver the road surface data, for example, the road surface μ is low and the road is dry, wet or frozen. In case that the road is slippery, it is further possible to warn such a state. Specifically, the tire-mounted sensor 1 and the receiver 21 are configured as described below.

Figure 3:
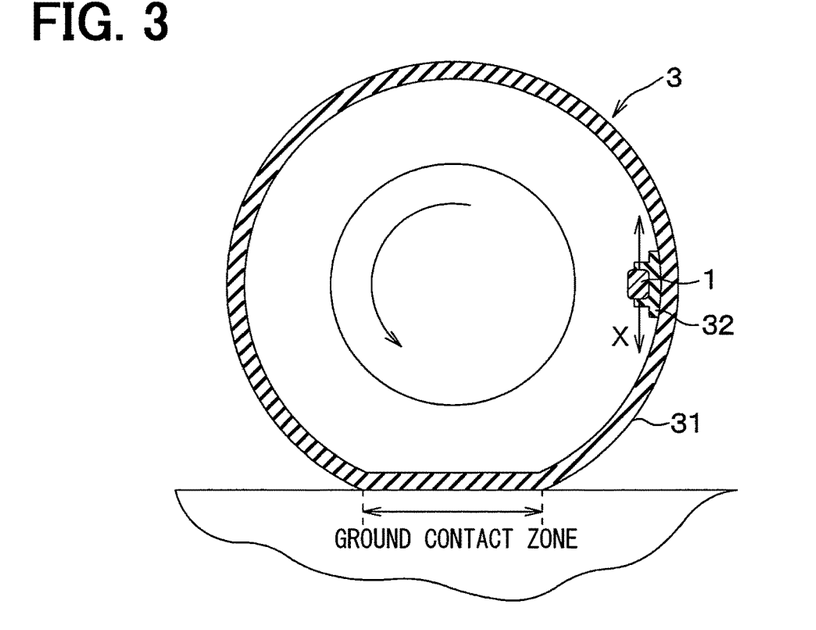
FIG. 3 is a sectional schematic view of a tire to which the tire-mounted sensor is attached.

The tire-mounted sensor 1 is a tire-side device provided at a tire side. As shown in FIG. 2, the tire-mounted sensor 1 is configured to include a power source 11, an acceleration sensor 12, a control unit 13, an LF (Low Frequency) receiver circuit 14 and an RF (Radio Frequency) transmitter circuit 15. As shown in FIG. 3, the tire-mounted sensor 1 is provided on a back surface side of a tread 31 of the tire 3. For example, the tire-mounted sensor 1 is fixed to the tire 3 by force-fitting with a rubber bracket 32 bonded to the back surface of the tread 31. The tire-mounted sensor 1 is detachable relative to the rubber bracket 32 so that it is removed from the rubber bracket 32 at time of tire exchange and fitted again to a rubber bracket 32, which is attached to a tire 3 after the change.

The power source 11 is formed of a battery, for example, and supplies power to drive each component of the tire-mounted sensor 1.

The acceleration sensor 12 is configured as a vibration detection unit for detecting vibrations applied to a tire. For example, the acceleration sensor 12 outputs an acceleration detection signal as a detection signal corresponding to vibrations in a tire-tangential direction indicated with an arrow X in FIG. 3, that is, a direction tangential to a circular orbit which the tire-mounted sensor 1 depicts when the tire 3 rotates. For more details, the acceleration sensor 12 generates as the detection signal an output voltage, which is positive in one direction and negative in the opposite direction, between two directions indicated with the arrow X.

The control unit 13 is a signal processing unit. The control unit 13 operates to generate road surface data by using the detection signal of the acceleration sensor 12 as a detection signal, which indicates the vibration data in the tire-tangential direction, and processing this detection signal, and sends the road surface data to the RF transmitter circuit 15.

Specifically, the control unit 13 extracts a ground-contact zone of the acceleration sensor 12 during rotation of the tire 3 based on the detection signal of the acceleration sensor 12, that is, a time change of the output voltage of the acceleration sensor 12. The ground-contact zone means an area of a part of the tread 31 of the tire 3, which corresponds to the location of attachment of the acceleration sensor 12 and contacting the road surface. In the present embodiment, since the location of arrangement of the acceleration sensor 12 is the location of arrangement of the tire-mounted sensor 1, the ground-contact zone is the same as the area of a portion of the tread 31 of the tire 3, which corresponds to the location of arrangement of the tire-mounted sensor 1 and is in contact with the road surface. In the following description, the location of arrangement of the tire-mounted sensor 1 in the tread 31 of the tire 3, that is, the location of arrangement of the acceleration sensor 12, is referred to as a device arrangement location.

Since high frequency components included in the detection signal of the acceleration sensor 12 generated in a period of the ground contact zone indicate the road surface state, the control unit 13 extracts the high frequency components from the detection signal and detects the road surface state such as the road surface μ based on the extracted high frequency components.

The control unit 13, thus detecting the road surface state, generates the road surface data indicating the road surface state and executes processing of sending it to the RF transmitter circuit 15. The road surface data is thus sent to the receiver 21 through the RF transmitter circuit 15.

Specifically, the control unit 13 is formed of a conventional microcomputer including a CPU, a ROM, a RAM, an I/O and the like and executes the processing described above based on a program stored in the ROM or the like. The control unit 13 includes, as functional units for executing such processing, a zone extraction unit 13a, a level calculation unit 13b and a data generation unit 13c.

Figure 4:
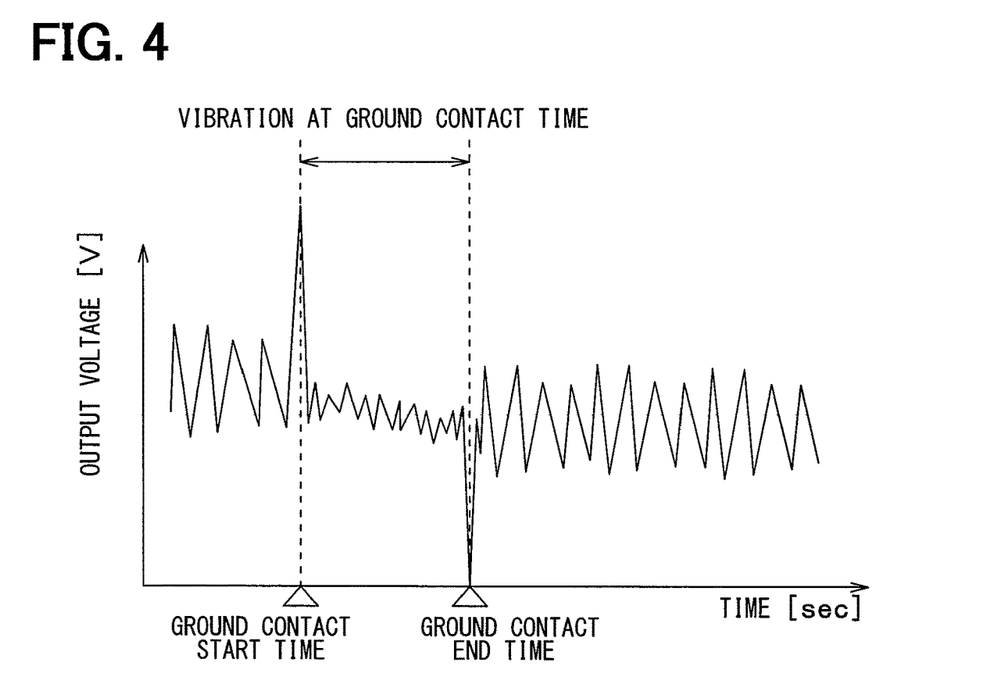
FIG. 4 is a waveform chart showing an output voltage of an acceleration sensor at time of tire rotation.

The zone extraction unit 13a extracts the ground contact zone by detecting a peak value of the detection signal indicated by the output voltage of the acceleration sensor 12. The output voltage waveform of the acceleration sensor 12 during tire rotation changes as shown in FIG. 4, for example. As shown in this figure, at a ground contact start time at which the part corresponding to the device arrangement location starts contacting the ground during the rotation of the tire 3, the output voltage of the acceleration sensor 12 takes a maximum value. The zone extraction unit 13a detects the ground contact start time, at which the output voltage of the acceleration sensor 12 takes the maximum value, as a first peak value timing. Further, as shown in FIG. 4, at a ground contact end time at which the part of the device arrangement location ends contacting the ground during rotation of the tire 3, the output voltage of the acceleration sensor 12 takes a minimum value. The zone extraction unit 13a detects the ground contact end time at which the output voltage of the acceleration sensor 12 takes the minimum value as a second peak value timing.

The output voltage of the acceleration sensor 12 takes the peak values at the above-described timings for the following reasons. When the device arrangement location comes to contact the ground during rotation of the tire 3, the part of the tire 3 having been in generally cylindrical shape near the acceleration sensor 12 is pressed and deformed in a planar shape. Receiving shock at this time, the output voltage of the acceleration sensor 12 takes the first peak value. When the part of the tread 31 corresponding to the device arrangement location leaves the ground surface during rotation of the tire 3, the part of the tire 3 is released from pressurization and restores to the generally cylindrical shape from the planar shape. Receiving shock at the time of restoring the original shape of the tire 3, the output voltage of the acceleration sensor 12 takes the second peak value. As described above, the output voltage of the acceleration sensor 12 takes the first peak value and the second peak value at the ground contact start time and the ground contact end time, respectively. Since a direction of shock at the time when the tire 3 is pressed and a direction of shock at the time when the tire 3 is released from pressurization are opposite, polarities of the output voltages are also opposite.

The zone extraction unit 13a extracts the ground contact zone of the acceleration sensor 12 by extracting the data of the detection signal including the timings of the first peak value and the second peak value and sends that it is within the ground contact zone to the level calculation unit 13b.

Since the output voltage of the acceleration sensor 12 takes the second peak value at the ground contact end time of the acceleration sensor 12, the zone extraction unit 13a transmits a transmission trigger to the RF transmitter circuit 15 at this timing. Thus the road surface data such as μ data generated by the data generation unit 13c as described below is transmitted from the RF transmitter circuit 15. Since the RF transmitter circuit 15 does not execute the data transmission always but executes the data transmission limitedly at the ground contact end time of the acceleration sensor 12, it is possible to reduce power consumption. Although the RF transmitter circuit 15 is exemplified to execute the data transmission at time when the output voltage of the acceleration sensor 12 takes the second peak value, the RF transmitter circuit 15 may executes the data transmission at other timings. Further, the execution of the data transmission is not limited to once in every one rotation of the tire 3 but may be once in every plural rotations of the tire 3 or plural times in every one rotation of the tire 3.

When it is sent from the control unit 13a that it is within the ground contact zone, the level calculation unit 13b calculates a level of the high frequency components, which arise from vibrations of the tire 3 and is included in the output voltage of the acceleration sensor 12 during the interval of the ground contact zone. The level calculation unit 13b sends such a calculation result to the data generation unit 13c as the road surface data such as the μ data. The level of the high frequency components is calculated as an index indicating the road surface state such as the road surface μ for the following reasons described below with reference to FIG. 5A, FIG. 5B and FIG. 6.

Figure 5A:
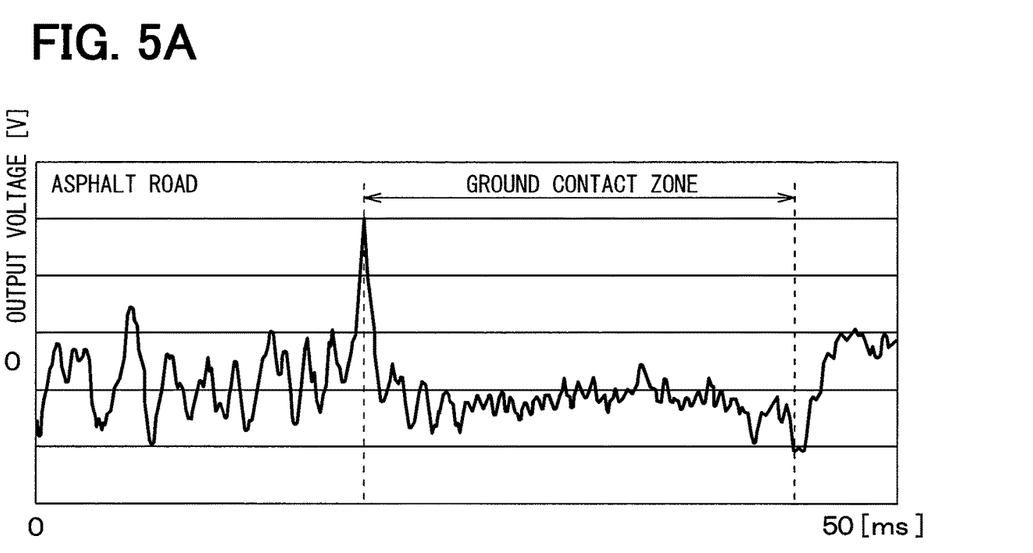
FIG. 5A is a chart showing a change in the output voltage of the acceleration sensor in case of traveling on a high μ road surface such as an asphalt road, a road surface μ of which is comparatively high.
Figure 5B:
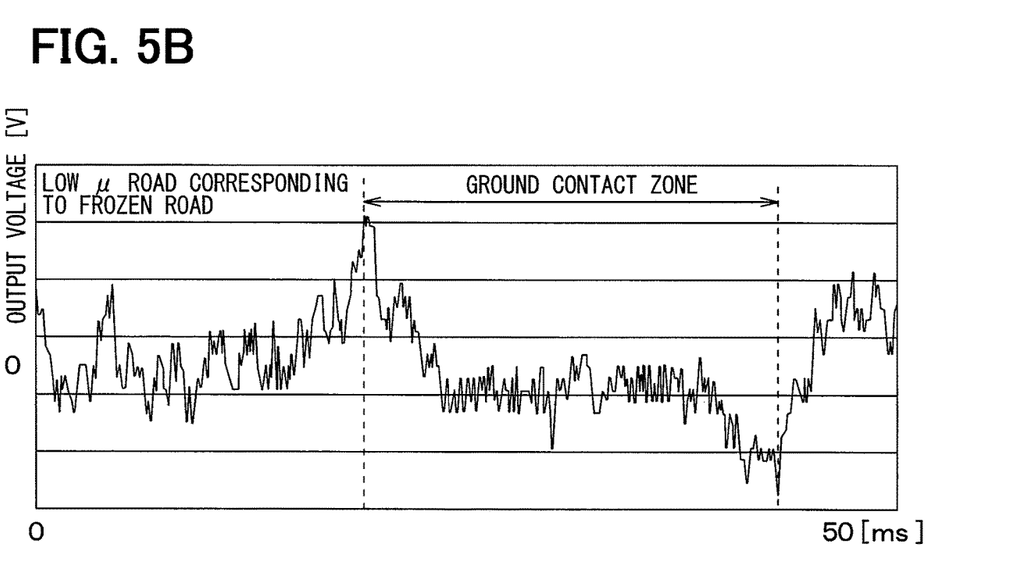
FIG. 5B is a chart showing a change in the output voltage of the acceleration sensor in case of traveling on a low μ road surface such as a frozen road, a road surface μ of which is comparatively low.

FIG. 5A shows a change of the output voltage of the acceleration sensor 12 in case of traveling on the high μ road surface like an asphalt road, the road surface μ of which is comparatively large. FIG. 5B shows a change of the output voltage of the acceleration sensor 12 in case of traveling on the low μ road surface like a road corresponding to a frozen road, the road surface μ of which is comparatively small.

As is evident from those figures, the first peak value and the second peak value appear at the start and the end of the ground contact zone, that is, the ground contact start time and the ground contact end time of the acceleration sensor 12, respectively, regardless of the road surface μ. However, the output voltage of the acceleration sensor 12 changes as affected by the road surface μ. For example, in case that the road surface μ is low like traveling on the low μ road surface, fine high frequency vibrations caused by slipping of the tire 3 are superimposed on the output voltage. This fine high frequency noise caused by slipping of the tire 3 is not superimposed so much in case that the road surface μ is high like traveling on the high μ road surface.

Figure 6:
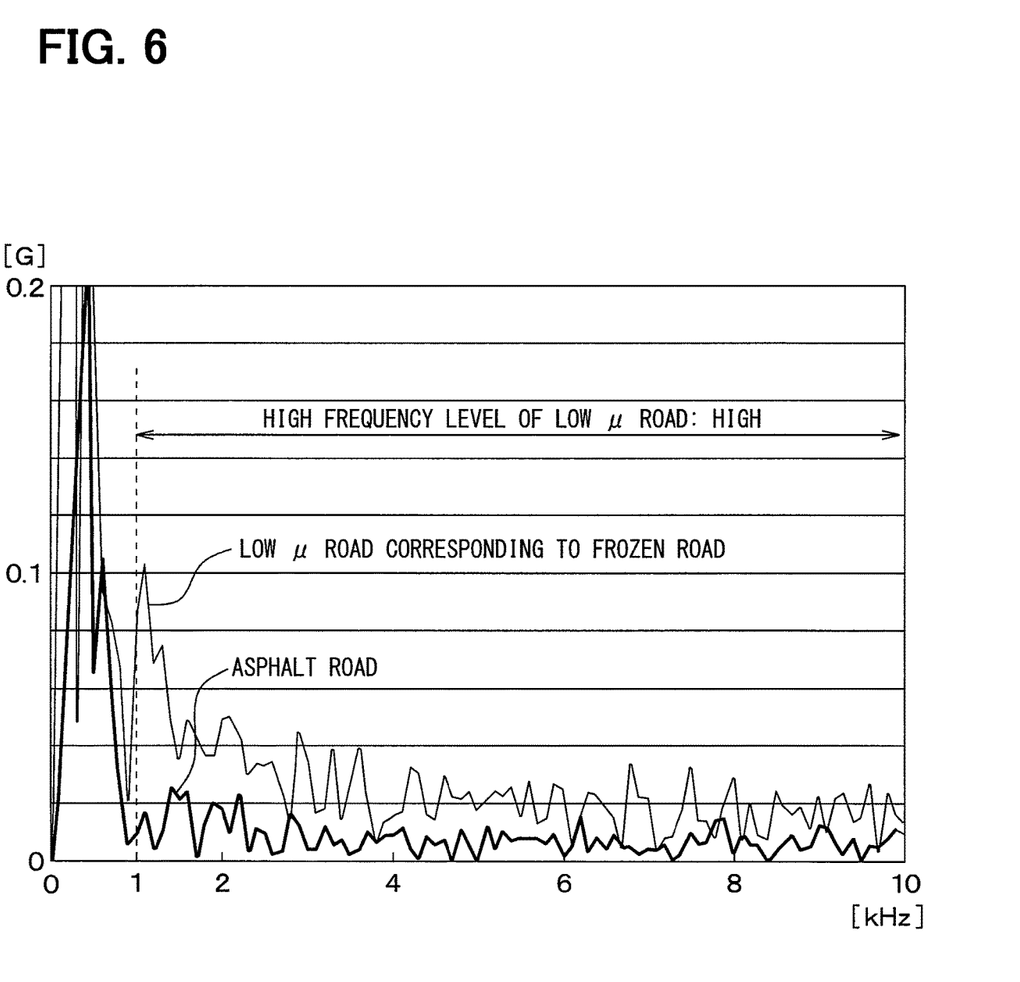
FIG. 6 is a chart showing a result of frequency analysis conducted on the output voltage during a ground contact period with respect to each case of traveling on the high μ road and the low μ road.

For this reason, frequency analysis of the output voltage in the ground contact zone with respect to the high road surface μ and low road surface μ produces results shown in FIG. 6. That is, the frequency analysis result indicates a high level in a low frequency band in any cases of traveling the high μ road surface and the low μ road surface. However, in a high frequency band of 1 kHz or more, the level is higher in case of the low road surface μ than in case of the high road surface μ. For this reason, the level of the high frequency components of the output voltage of the acceleration sensor 12 is the index indicating the road surface state.

Therefore, by calculating the level of the high frequency components of the output voltage of the acceleration sensor 12 in the ground contact zone by the level calculation unit 13b, it is possible to use the calculated level as the μ data. Further, it is possible to detect a type of the road surface corresponding to the road surface μ as the road surface state. For example, it is possible to determine the frozen road when the road surface μ is low.

For example, the high frequency component level is calculated as an integrated voltage value by extracting the high frequency components from the output voltage of the acceleration sensor 12 and integrating the high frequency components extracted during the interval of the ground contact zone. Specifically, the high frequency components of the frequency band fa to fb, in which it is assumed to change in correspondence to the road surface state or the road surface μ, are extracted by filtering or the like and a voltage of the high frequency components in the frequency band fa to fb extracted by the frequency analysis is integrated to acquire the integrated voltage value. For example, the high frequency components are charged in a capacitor. Thus the charge amount is greater in case that the road surface μ is low like traveling on the low p road surface than in case that the road surface μ is high like traveling on the high μ road surface. By thus using the charge amount as the μ data, it is possible to estimate the road surface μ is lower as the charge amount indicated by the μ data is greater.

The data generation unit 13c generates the road surface data based on the calculation result of the level calculation unit 13b. For example, the data generation unit 13c uses the μ data as it is as the road surface data or generates data as the road surface data by determining the road surface state like the frozen road or the asphalt road based on the μ data. According to the present embodiment, the road surface state is estimated in the data generation unit 13c. For this purpose, a threshold value of a road surface state determination condition used for estimating the road surface state is stored in the data generation unit 13c. This threshold value is reset and stored when the tire is exchanged.

The LF receiver circuit 14 is a receiver unit which receives a command input and the like through a tool 200. For example, when an LF wave including an instruction command is transmitted to the tire-mounted sensor 1 through the tool 200 at, for example, a car repair shop, the instruction command is transmitted to the control unit 13 through the LF receiver circuit 14. In case that the instruction command is a learning mode transition signal described later, the control unit 13 determines that the tire is exchanged. The control unit 13 reads the output voltage of the acceleration sensor 12 and resets the threshold value of the road surface state determination condition by the data generation unit 13c. Specifically, when the data generation unit 13c receives information indicating the tire exchange, that is, when it is determined that the tire has been exchanged, the control unit 13 sets the threshold value of the road surface state determination condition again. A detailed method of resetting the threshold value of the road surface state determination condition will be described later.

The RF transmitter circuit 15 forms a transmission unit, which transmits the road surface data such as the µ data sent from the data generation unit 13c to the receiver 21. The communication between the RF transmitter circuit 15 and the receiver 21 may be executed by conventional short-range radio communication technology like Bluetooth (registered trademark). Although the road surface data may be transmitted at arbitrary timing, the road surface data is transmitted from the RF transmitter circuit 15 in the present embodiment in response to a transmission trigger sent from the zone extraction unit 13a at the ground contact end time of the acceleration sensor 12. It is thus possible to reduce power consumption by executing the data transmission by the RF transmitter circuit 15 not continuously but limitedly at the ground contact end time of the acceleration sensor 12.

The road surface data is sent with individual identification information (hereinafter referred to as ID information) provided for each tire 3 of a wheel of the vehicle. The position of each wheel is specified by a conventional wheel position detection device which detects to which position of the vehicle the wheel is attached. Thus it is possible to determine to which wheel the data belongs by sending the road surface data together with the ID information to the receiver 21.

The receiver 21 receives the road surface data transmitted from the tire-mounted sensor 1, estimate the road surface state based on the received road surface data, sends the estimated road surface state to the notification device 22 and conveys, if necessary, the road surface state to a driver from the notification device 22. Thus, the driver tries to drive the vehicle in a manner matching the road surface state and is enabled to avoid danger to the vehicle. For example, the estimated road surface state may be displayed always by the notification device 22 or the road surface state may be displayed to warn the driver only when the vehicle need be driven more carefully than usual, for example, when the estimated road surface state corresponds to the low µ road like the wet road or the frozen road. Further, the road surface state may be sent to an electronic control unit (hereinafter referred to as ECU) such as a brake ECU, which executes vehicle motion control, from the receiver 21 so that the vehicle motion control is executed based on the sent road surface state.

The notification device 22 is configured with a meter display device for example and used to notify the driver of the road surface state. In case that the notification device 22 is configured with the meter display device, it is located at a position which the driver is capable of recognition during driving of the vehicle, for example, within an instrument panel in the vehicle. The meter display device notifies the driver visually of the road surface state in a mode enabling recognition of the road surface state by displaying the road surface state, when the road surface state is sent from the receiver 21.

The notification device 22 may alternatively be configured with a buzzer or voice guidance device. In such a case, the notification device 22 notifies the driver of the road surface state audibly by buzzer sound or voice guidance. Although the meter display device is exemplarily referred to as the notification device 22 for providing visual notification, the notification device 22 may be configured with a display device like a head-up display which provides information display.

The road surface state estimation device 100 according to the present embodiment is configured as described above. Each unit forming the vehicle body side system 2 is connected through an in-vehicle LAN (Local Area Network) like CAN (Controller Area Network) communication. Thus each unit is capable of communicating information mutually through the in-vehicle LAN.

An operation of the tire-mounted sensor 1 of the road surface state estimation device 100 according to the present embodiment will be described next.

As described above, in the tire-mounted sensor 1, the road surface data is acquired based on the detection signal of the acceleration sensor 12 by analyzing in the control unit 13 the output voltage waveform at every one rotation of the tire 3. The road surface data is transmitted, when the transmission trigger is outputted from the control unit 13 to the RF transmitter circuit 15 at timing of the second peak value of the output voltage waveform.

On the other hand, when the data is transmitted from the RF transmitter circuit 15, the receiver 21 receives it, estimates the road surface state based on the road surface data and conveys the estimated road surface state to the notification device 22. Thus it is possible to notify the driver of the road surface state.

Further, when the instruction command is sent to the tire-mounted sensor 1 through the tool 200 at the car repair shop and the like, the instruction command is received by the LF receiver circuit 14. In case that this instruction command is sent to the control unit 13 and the instruction command is a learning mode transition signal, the control unit 13 reads the output voltage of the acceleration sensor 12 and resets the threshold value of the road surface state determination condition. The instruction command, specifically the learning mode transition signal, is information indicating that the tire exchange has been made. The control unit 13 accumulates the data of the output voltage of the acceleration sensor 12 during a period of plural rotations of the tire 3 and resets the threshold value of the road surface state determination condition.

For example, at the car repair shop and the like, the asphalt road on which the vehicle normally travels most frequently, that is, the high µ road, is selected as a road surface for learning and various threshold values, which are used for the road surface state determination, based on the vibration data acquired when traveling on the high µ road. Thus, in case of the present embodiment, various threshold values stored in the data generation unit 13c are reset to new threshold values.

Figure 7:
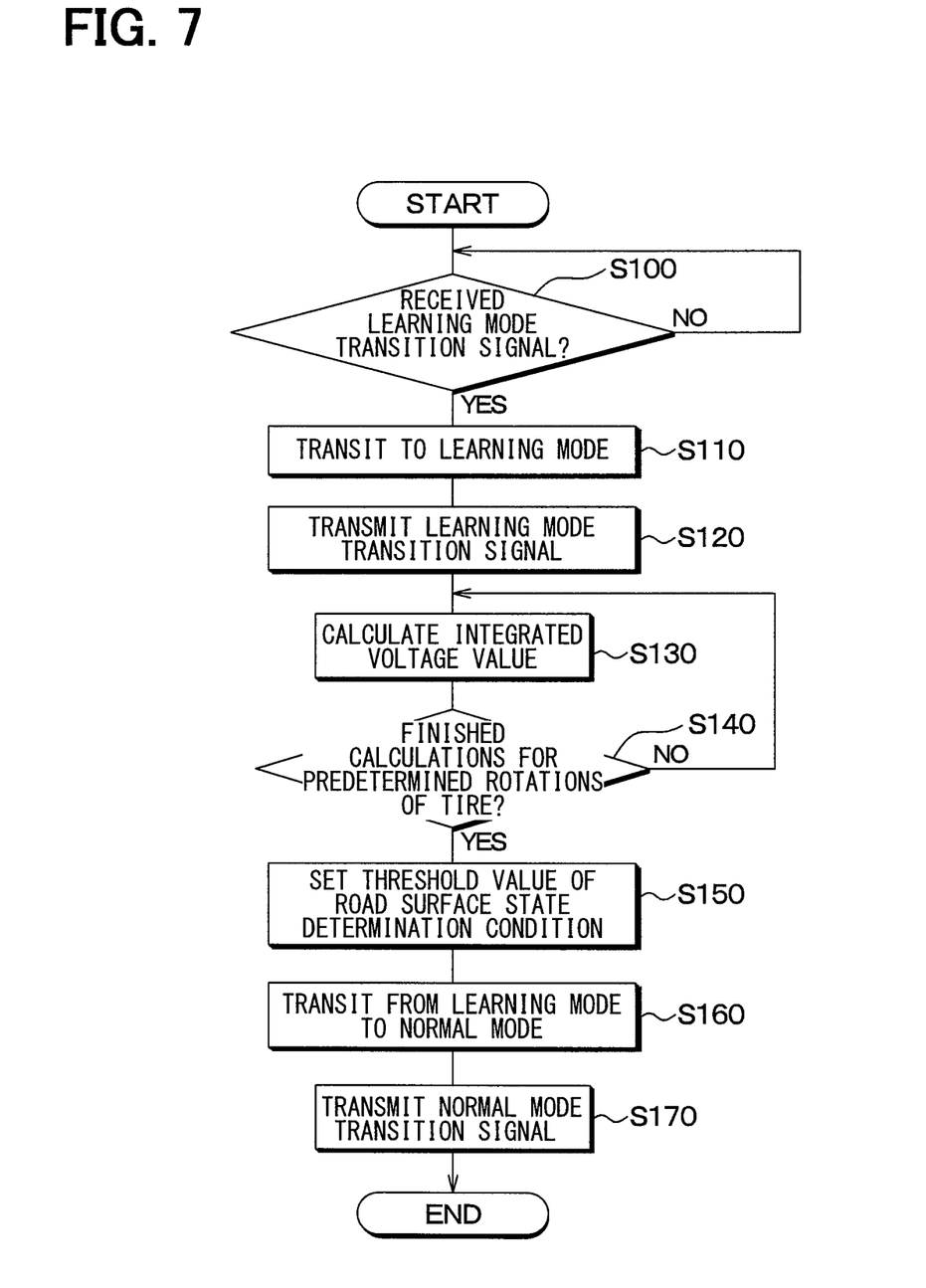
FIG. 7 is a flowchart of details of threshold value resetting processing at time of a tire exchange.

The method of threshold value resetting will be described with reference to a flowchart of threshold value resetting processing shown in FIG. 7. The threshold value resetting processing shown in FIG. 7 is executed at every predetermined control period by the control unit 13 receiving electric power from the power source 11.

First at step S100, it is determined whether the learning mode transition signal is received as the instruction command sent through the tool 200 at the time of tire exchange, that is, whether the tire exchange has been made. In case that the learning mode transition signal is received, step S110 and subsequent steps are executed. In case that the learning mode transition signal is not received, this processing is repeated until it is determined that the learning mode transition signal is received. Transitioning to the learning mode at step S110, the threshold value used as the road surface state determination condition is reset at step S120 to step S170. Transitioning to the learning mode, the control unit 13 suspends the road surface state determination during that period and executes various processing for resetting the threshold value without transmitting the road surface data.

Specifically, at step S120, the control unit 13 executes processing for transmitting the learning mode transition signal to the vehicle body side system 2. That is, the learning mode transition signal, which indicates the transition to the learning mode, is outputted from the control unit 13 to the RF transmitter circuit 15 and the learning mode transition signal is transmitted from the RF transmitter circuit 15. Thus the vehicle body side system 2 recognizes the transition of the tire-mounted sensor 1 to the learning mode and does not execute the road surface state estimation during that period. The control unit 13 may notify the driver that it is under the learning mode through the notification device 22 so that the driver is notified of the transition to the learning mode.

At next step S130, an integrated voltage value is calculated by signal processing the output voltage waveform of the acceleration sensor 12 and integrating the high frequency components in the ground contact zone and accumulates the integrated voltage values. Further, at step S140, it is determined whether the number of rotations of the tire 3 reached a predetermined number, for example, 20, and the processing of step S130 is repeated until the predetermined number of rotations is attained. Thus, the integrated voltage values are accumulated during a period until the number of rotations of the tire 3 reaches the predetermined number of rotations.

Subsequently at step S150, the threshold value for the road surface state determination condition is reset in the control unit 13. For example, by calculating an average value of the integrated voltage values accumulated at step S140, the threshold value is set to a value, which is a sum of a predetermined value and the calculated average value or a product of a predetermined coefficient and the average value. Based on this threshold value, it is possible to determine that the road surface state is the high μ road and the low μ road in case that the integrated voltage value acquired later is less than and more than the threshold value, respectively.

It is preferred in resetting the threshold value to reset the threshold value for each vehicle speed or for a reference vehicle speed. In case of determining the road surface state by setting the threshold value for each vehicle speed or for the reference vehicle speed, the acquired integrated voltage value is compared with the threshold value corresponding to the vehicle speed or comparing the integrated voltage value after correcting it to a value, which is converted to the reference vehicle speed, with the threshold value. It is thus possible to determine the road surface state more accurately. That is, since the first peak value and the second peak value increase and the vehicle speed increases and the integrated voltage value of the high frequency components of the output voltage of the acceleration sensor 12 increases as well, the threshold value is corrected to increase with an increase in the vehicle speed or the integrated voltage value is corrected to a value which corresponds to the reference vehicle speed.

Here, only one threshold value for determining the high μ road and the low μ road is exemplified. It is however possible to set the threshold value for determining the type of the road surface such as the snow road and the wet road. Since the convexoconcave of the road surface is large in case of the snow road, the vibration of the output voltage of the acceleration sensor 12 increases outside the ground contact zone rather than the ground contact zone, that is, in a period from the second peak value to the first peak value. For this reason, by executing the frequency analysis on the detection signal of the acceleration sensor 12 during the period from the second peak value to the first peak value, it is possible to reset the threshold value for determining whether the road is the snow road or the normal road such as the asphalt road. In case of the wet road, the first peak value and the second peak value are not so sharp and the output voltage of the acceleration sensor 12 changes differently at the time of reaching the first peak value and the second peak value. Further, in case of the wet road, the vibration caused by slipping in the ground contact zone increases because it is slippery. For this reason, a change amount threshold value which is a threshold value of a change rate of the output voltage of the acceleration sensor 12 at the time of reaching the first peak value and the second peak value and an integrated value threshold value which is a threshold value of the integrated voltage value in the ground contact zone are reset. After this resetting, the road surface is determined to be the wet road in case that the change rate is smaller than the change amount threshold value and the integrated voltage value is larger than the integrated value threshold value, for example.

Then at step S160, the mode changes from the learning mode to the normal mode. Thus the road surface state determination is started again. As the threshold value used to determine the road surface state at this time, the threshold value reset at step S150 is used. Then at step S170, the processing for transmitting the normal mode transition signal to the vehicle body side system 2 is executed. That is, the normal mode transition signal indicating the transition from the learning mode to the normal mode is outputted from the control unit 13 to the RF transmitter circuit 15 and the normal mode transition signal is transmitted from the RF transmitter circuit 15. Thus the transition of the tire-mounted sensor 1 to the normal mode, in which the road surface state determination is executed, is conveyed to the vehicle body side system 2 as well. As a result, in the vehicle body side system 2, the road surface state estimation is executed based on the road surface data sent from each tire-mounted sensor 1.

As described above, by sending the instruction command, which is the information indicating that the tire has been exchanged, to the tire-mounted sensor 1 through the tool 200 at the car repair shop and the like at the time of tire exchange, it is possible to automatically reset the threshold value of the road surface state determination condition. The road surface state estimation device is enabled to accurately estimate the road surface state even in case that the tire-mounted sensor 1 having been attached to the tire 3 used before the tire exchange is reused at the time of tire exchange.

Second Embodiment

A second embodiment will be described. The present embodiment is different from the first embodiment in that the vehicle body side system 2 is configured to determine the road surface state condition. Other configurations are similar to the first embodiment and hence only differences from the first embodiment will be described.

In the first embodiment, the tire-mounted sensor 1 is configured to determine the road surface state and transmit the road surface data indicating the determination result so that the vehicle body side system 2 finally estimates the road surface state. Contrary to this configuration, the tire-mounted sensor 1 may be configured to transmit the integrated voltage value of the high frequency components of the output voltage of the acceleration sensor 12 as the road surface data and the vehicle body side system 2 may be configured to determine the road surface state based on the road surface data. For example, the vehicle body side system 2 may store the threshold value as the road surface state determination condition and determine whether the road surface state is the high μ road or the low μ road by comparing the integrated voltage value and the like indicated by the road surface data with the threshold value. In this case, the threshold value is stored in the vehicle body side system 2. For this reason, the threshold value of the road surface state determination condition is reset in the vehicle body side system 2 at the time of tire exchange.

It is thus possible to store the threshold value of the road surface state determination condition in the vehicle body side system 2 and determine the road surface state of the acceleration sensor 12. In this case, the threshold value resetting processing executed by the control unit 13 described in the first embodiment is exchanged as shown in a flowchart of FIG. 8. That is, after executing steps S200, S210, S220 and to S230 similarly to steps S100, S110, S120 and S130, respectively, shown in FIG. 7, processing for transmitting the road surface data such as the integrated voltage value to the vehicle body side system 2 is executed at step S240. Then at step S250, similar processing as step S140 shown in FIG. 7 is executed. Thus, the processing for transmitting the road surface data to the vehicle body side system 2 executed at step S240 is executed for the period of the predetermined number of rotations of the tire 3.

Figure 8:
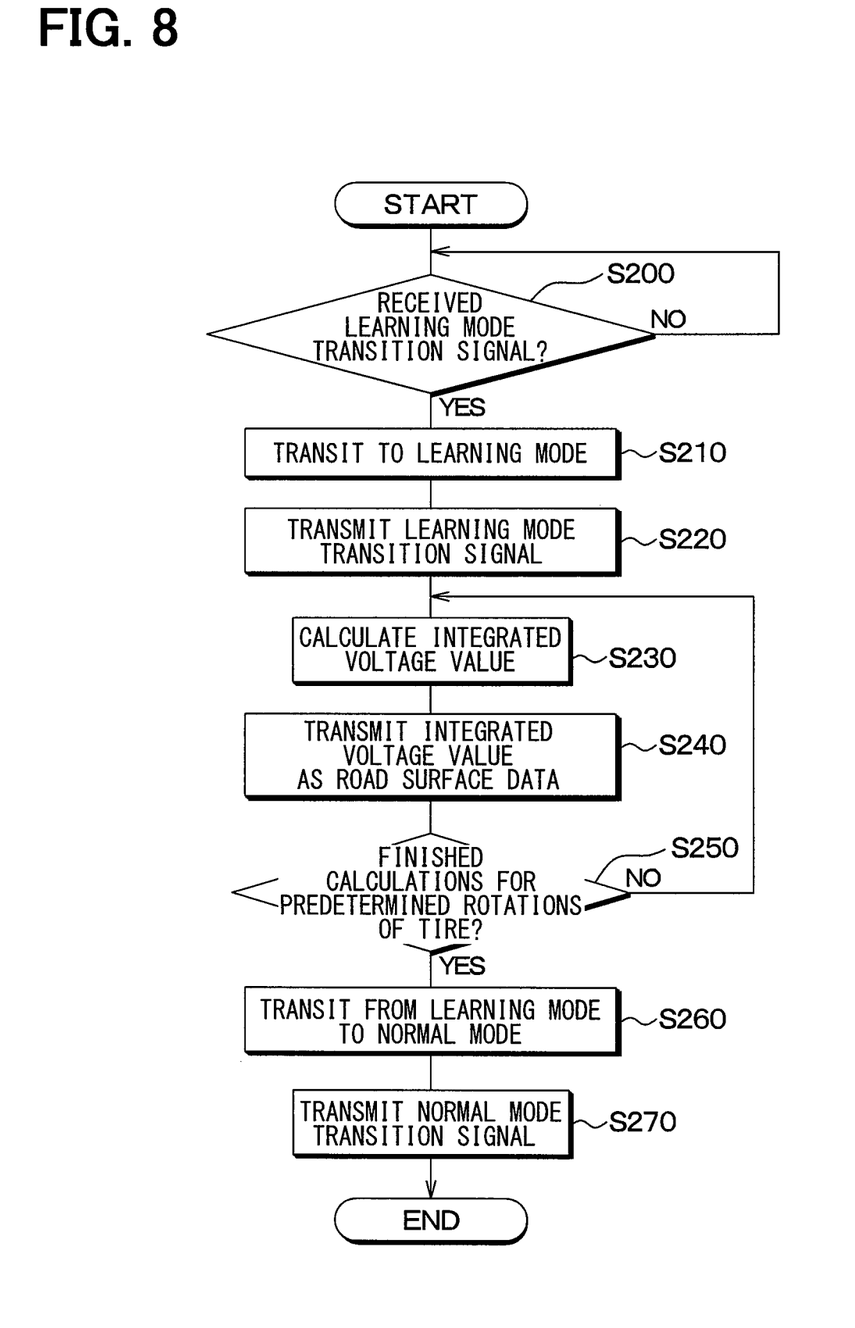
FIG. 8 is a flowchart of details of threshold value resetting processing at time of a tire exchange according to a second embodiment.

Based on those transmitted data, the integrated voltage values and the like are accumulated in the vehicle body side system 2. Then, for example, the average value of the integrated voltage values is calculated and the threshold value is set to a value, which is calculated by adding the predetermined value to the average value or multiplying the average value by the predetermined coefficient.

Then, at step S260 and step S270, same processing as step S160 and step S170 shown in FIG. 7 are executed. As described above, it is possible to reset the threshold value of the road surface state determination condition at the time of tire exchange and the like in the vehicle body side system 2.

Third Embodiment

A third embodiment will be described. The present embodiment is different from the first and second embodiments in that the vehicle body side system 2 is configured to determine the road surface state. Other configurations are similar to the first and second embodiments and hence only differences from the first and second embodiments will be described.

In the present embodiment, the threshold value of the road surface state determination condition is reset automatically without using the tool 200 by acquiring the information indicating the tire exchange in case that the tire-mounted sensor 1 is reused at the time of tire exchange.

Figure 9:
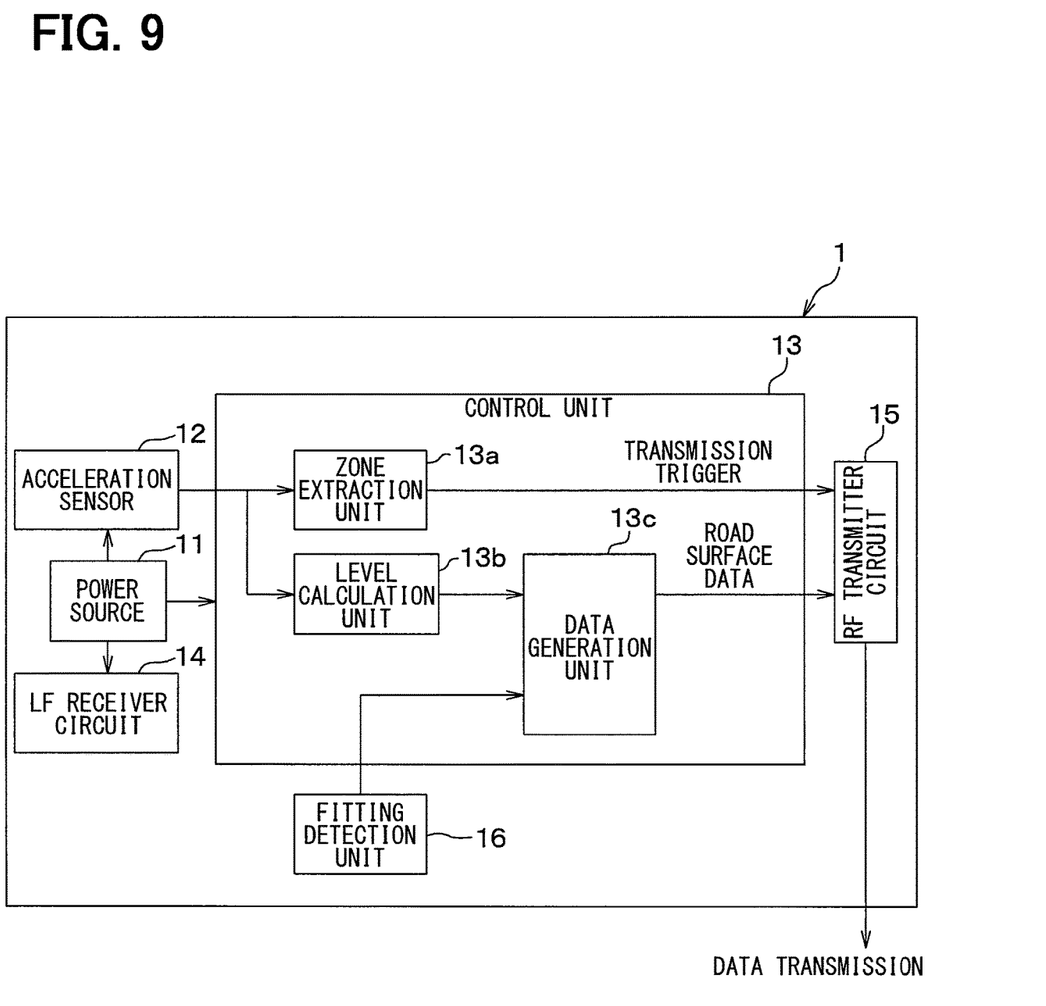
FIG. 9 is a block diagram of a tire-mounted sensor according to a third embodiment.

As shown in FIG. 9, a fitting detection unit 16 which detects that the tire-mounted sensor 1 is fitted to the rubber bracket 32 is provided. The fitting detection unit 16 is an exchange detection unit for detecting that the tire-mounted sensor 1 is attached to a post-exchange tire 3.

The fitting detection unit 16 may be configured with a detection circuit which turns on upon contacting a conductive part (not shown) provided on a contact surface of the rubber bracket 32 for contacting the tire-mounted sensor 1. That is, since the detection circuit provided in the tire-mounted sensor 1 is separated from the conductive part when detached from the bracket 32, the detection circuit electrically turns off. When the tire-mounted sensor 1 is attached again to the rubber bracket 32, the detection circuit contacts the conductive part and turns on. For this reason, since the detection circuit switches over from an off-state to an on-state, it is possible to detect that the tire-mounted sensor 1 is attached to the tire 3 after the exchange. The control unit 13 determines that the tire exchange has been made based on the detection of the switchover between the off-state and the on-state by the fitting detection unit 16 by using the switchover of the off-state and the on-state as the information indicating the tire exchange.

As described above, the tire exchange is determined by providing the tire-mounted sensor 1 with the fitting detection unit 16 and detecting the fitting of the tire-mounted sensor 1 to the rubber bracket 32 by the fitting detection unit 16. Thus it is possible to reset the threshold value of the road surface state determination condition automatically. For example, in place of step S100 in FIG. 7, processing of determining whether the tire-mounted sensor 1 has been fitted to the bracket 32 is executed by the fitting detection unit 16. When the fitting is detected, step S110 and subsequent step S110 are executed. Thus the threshold value of the road surface state is reset automatically.

Fourth Embodiment

A fourth embodiment will be described. The present embodiment is different from the first to third embodiments in that the threshold value of the road surface state determination condition is varied based on convexoconcave of the tread. Other configurations are similar to the first to third embodiments and hence only differences from the first to third embodiments will be described.

In the present embodiment, the tire-mounted sensor is configured to detect a change in the convexoconcave of the tread 31 of the tire 3 based on the output voltage of the acceleration sensor 12 and change the threshold value of the road surface state determination condition by automatically switching over to the learning mode when the change of the convexoconcave is detected.

For example, in case that the tire 3 has little wear like a new tire, a height of the convexoconcave provided by grooves formed in the tread 31 is higher in comparison to a worn state and hence the tire 3 is in a soft state and elastically deformable easily. For this reason, the damping factor of vibration of the tire is large and the vibration of the output voltage waveform of the acceleration sensor 12 becomes smaller. As the tire 3 wears more, the vibration of the output voltage waveform of the acceleration sensor 12 gradually increases.

However, such a change of the output voltage waveform of the acceleration sensor 12 progresses slowly and does not change rapidly as far as traveling on the same type of road surfaces. For this reason, the integrated voltage value of the high frequency components in the output voltage of the acceleration sensor 12 acquired when traveling on the asphalt road, for example, is stored as past information in a memory of the tire-mounted sensor 1. For example, since stopping of the tire 3 is detected based on the detection signal of the acceleration sensor 12, the integrated voltage value acquired before stopping of the tire 3 is stored as the past information. In case that the road surface state is not suitable for storing the integrated voltage value acquired at that time, for example, the road surface state is not the asphalt road, the integrated voltage value acquired when traveling on the asphalt road before stopping of the tire 3 may be stored as the past information. It is possible to determine that the road surface state corresponds to the asphalt road based on that the integrated voltage value is smaller than the stored threshold value, for example. The integrated voltage value at this time is stored.

When the change of the integrated voltage value acquired this time relative to the integrated voltage value stored as the past information is rapid, it is determined that the height of the convexoconcave of the groove of the tread 31 changed rapidly. It is therefore possible to determine that the tire exchange has been made by using the information which indicates the tire exchange when the change of the integrated voltage value is rapid, for example, when a difference between the acquired integrated voltage value and the integrated voltage value stored as the past information is equal to or larger than a threshold value. When the tire exchange is thus determined, the threshold value of the road surface state determination condition is reset. For this determination, it is necessary that the acquired integrated voltage value is based on the similar road surface, for example, asphalt road, on which the integrated voltage value stored as the past information is based. For this reason, it may be so modified to reset the threshold value of the road surface state determination condition only when the integrated voltage value acquired this time is smaller than the integrated voltage value stored as the past information.

It is thus possible to reset the threshold value of the road surface state determination condition automatically even in case that the height of convexoconcave of the groove of the tread 31 is assumed to have changed rapidly. Even in this case, in place of step S100 in FIG. 7, for example, it is determined whether the height of the convexoconcave of the groove of the tread 31 has changed rapidly. In case that the rapid change is detected, the processing of step S110 and subsequent steps are executed thereby to reset automatically the threshold value of the road surface state determination condition.

Other Embodiment

The present disclosure made with reference to the embodiments described above is not limited to the disclosed embodiments but may include various modifications and variations which are within equivalent scopes. In addition, various combinations and forms as well as other combinations and forms, which include only one element, more or less than that, are covered by and within the scope of the present disclosure.

For example, in each embodiment described above, the threshold value of the road surface state determination condition is reset in case of the asphalt road. This is because vehicles travel on the asphalt road most frequently. For this reason, the threshold value may be reset in case of the road surface states other than the asphalt road. For example, by configuring the tool 200 to be capable of selecting a desired road surface state, a threshold value which is assumed to match the selected road surface state may be set based on the output voltage waveform of the acceleration sensor 12. With this configuration, it is made possible to execute the resetting of the threshold value in each of various road surface states thereby to reset the threshold value more accurately.

Further, in the road surface state estimation device 100 described in each embodiment, the ground contact zone is specified from the detection signal of the acceleration sensor 12 forming the vibration detection unit and the result of calculation of the level of the high frequency components in the detection signal, which is generated in the ground contact zone, is used as the road surface data. However, this is also one exemplary method of detecting the road surface state using the detection signal of the vibration detection unit. It is also possible to detect the road surface state by other methods using the detection signal of the vibration detection unit.

Further, although the vibration detection unit is formed exemplarily of the acceleration sensor 12, the vibration detection unit may be formed of other vibration detection elements such as a piezoelectric component. Further, the power source 11 may be formed of a power generating element without being limited to batteries. For example, in case of using the vibration detection and power generation element, the vibration detection and power generation element forms not only the vibration detection unit but also the power source 11.

Further, in each embodiment described above, the receiver 21 performs the function of the control unit, which estimates the final road surface state.

However, this is just one example. Alternatively, the control unit may be provided separately from the receiver 21 or other ECUs such as a brake ECU may be used to operate as the control unit.

The embodiments described above are not irrelevant to each other and hence may be combined appropriately unless the combination results in inoperative device. For example, the first embodiment or the second embodiment may be combined with the third embodiment or the fourth embodiment.

What is claimed is:

1. A road surface state estimation device for estimating a road surface state of a travel road surface of a vehicle, the road surface state estimation device comprising:
   a tire-mounted sensor including a vibration detection sensor for outputting an output voltage corresponding to a magnitude of vibration of a tire as a detection signal, a signal processing unit, including a processor and a memory, for detecting the road surface state from vibration data indicated by the detection signal of the vibration detection sensor and a transmitter unit for transmitting road surface data indicating the road surface state, and attached to a back surface of the tire; and
   a vehicle body side system provided in a vehicle body side and including controller for receiving the road surface data transmitted from the transmitter unit and estimating the road surface state based on the road surface data, wherein
   the signal processing unit changes a threshold value of a road surface state determination condition used in detecting the road surface state from the vibration data,
   the tire-mounted sensor includes a receiver for receiving an instruction command transmitted from a tool, and
   the signal processing unit changes the threshold value of the road surface state determination by transitioning to a learning mode upon the receiver receiving the instruction command from the tool.

2. The road surface state estimation device according to claim 1, wherein:
   the signal processing unit changes the threshold value of the road surface state determination condition upon determination of an exchange of the tire.

3. The road surface state estimation device according to claim 1, wherein:
the signal processing unit determines whether the tire has been exchanged and changes the threshold value of the road surface state determination condition upon determination of a tire exchange.

4. The road surface state estimation device according to claim 1, wherein:
the tire-mounted sensor is detachable from the tire and includes an exchange detection sensor for detecting attachment to a post-exchange tire when the tire has been exchanged; and
the signal processing unit changes the threshold value of the road surface state determination by transitioning to a learning mode upon detection of the tire by the exchange detection sensor that the tire-mounted sensor has been attached to the post-exchange tire.

5. The road surface state estimation device according to claim 1, wherein:
the signal processing unit stores past information of the road surface data acquired during traveling on a certain road surface and changes, when traveling on the certain road surface is detected based on the road surface data acquired during travel, the threshold value of the road surface state determination by transitioning to the learning mode upon detection of a change in a height of convexoconcave of a groove of a tread of the tire based on the road surface data acquired during the travel and the past information.

6. The road surface state estimation device according to claim 1, wherein:
the signal processing unit includes a zone extraction unit, including a processor and a memory, for extracting a ground contact zone, in which a part of a tread of the tire corresponding to a location of arrangement of the vibration detection sensor contacts a ground in one rotation of the tire, and a level calculation unit, including a processor and a memory, for calculating an integrated voltage value as a level of high frequency component of the detection signal in the ground contact zone by integrating the output voltage of the vibration detection sensor; and
the signal processing unit changes the threshold value which is compared, as a threshold value of the road surface state determination, with the integrated voltage value.

7. A road surface state estimation device for estimating a road surface state of a travel road surface of a vehicle, the road surface state estimation device comprising:
a tire-mounted sensor including a vibration detection sensor for outputting an output voltage corresponding to a magnitude of vibration of a tire as a detection signal, a signal processing unit, including a processor and a memory, for detecting the road surface state from vibration data indicated by the detection signal of the vibration detection sensor and a transmitter unit for transmitting road surface data indicating the road surface state, and attached to a back surface of the tire; and
a vehicle body side system provided in a vehicle body side and including a controller for receiving the road surface data transmitted from the transmitter unit and estimating the road surface state based on the road surface data, wherein
the controller changes a threshold value of a road surface state determination condition used in detecting the road surface state from the vibration data,
the tire-mounted sensor includes a receiver for receiving an instruction command transmitted from a tool,
the signal processing unit transitions to a learning mode upon the receiver receiving the instruction command from the tool, and transmits the road surface data to the vehicle body side system through the transmitter unit, and
the controller changes the threshold value of the road surface state determination based on the road surface data transmitted from the tire-mounted sensor during a period of the learning mode.

8. The road surface state estimation device according to claim 7, wherein:
the controller changes the threshold value of the road surface state determination condition upon determination of an exchange of the tire.

9. The road surface state estimation device according to claim 7, wherein:
the controller determines whether the tire has been exchanged and changes the threshold value of the road surface state determination condition upon determination of tire exchange.

10. The road surface state estimation device according to claim 7, wherein:
the tire-mounted sensor is detachable from the tire and includes an exchange detection sensor for detecting attachment to a post-exchange tire when the tire has been exchanged;
the signal processing unit transitions to a learning mode upon detection of the tire by the exchange detection sensor that the tire-mounted sensor has been attached to the post-exchange tire, and then the signal processing unit transmits the road surface data to the vehicle body side system through the transmitter unit; and
the controller changes the threshold value of the road surface state determination based on the road surface data transmitted from the tire-mounted sensor during a period of the learning mode.

11. The road surface state estimation device according to claim 7, wherein:
the signal processing unit stores past information of the road surface data acquired during traveling on a certain road surface, transitions to the learning mode upon detection of a change in a height of convexoconcave of a groove of a tread of the tire based on the road surface data acquired during the travel and the past information when traveling on the certain road surface is detected based on the road surface data acquired during travel, and transmits the road surface state data to the vehicle body side system through the transmitter unit; and
the controller changes the threshold value of the road surface state determination based on the road surface data transmitted from the tire-mounted sensor during the period of the learning mode.

12. The road surface state estimation device according to claim 7, wherein:
the signal processing unit includes a zone extraction unit, including a processor and a memory, for extracting a ground contact zone, in which a part of a tread of the tire corresponding to a location of arrangement of the vibration detection sensor contacts a ground in one rotation of the tire, and a level calculation unit, including a processor and a memory, for calculating an integrated voltage value as a level of high frequency component of the detection signal in the ground contact zone by integrating the output voltage of the vibration detection sensor; and the controller changes the threshold value which is compared, as a threshold value of the road surface state determination, with the integrated voltage value.

* * * * *